C. D. VOLLMER AND M. LASKOWITZ.
AUTOMOBILE ALARM.
APPLICATION FILED JULY 23, 1919.
1,435,675.
Patented Nov. 14, 1922.
5 SHEETS—SHEET 1.
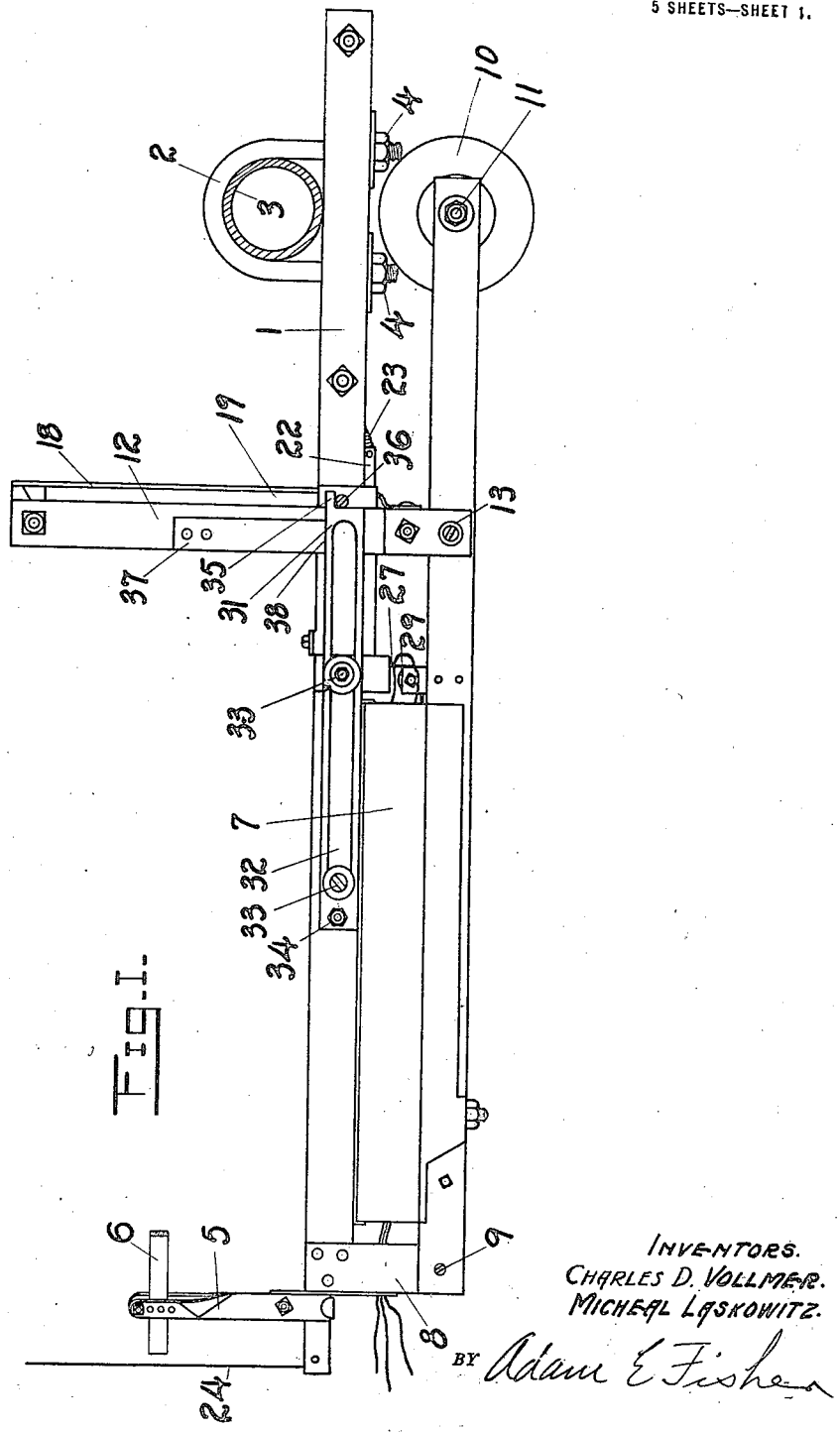
INVENTORS.
CHARLES D. VOLLMER.
MICHEAL LASKOWITZ.
BY Adam E Fisher
ATTORNEY.

C. D. VOLLMER AND M. LASKOWITZ.
AUTOMOBILE ALARM.
APPLICATION FILED JULY 23, 1919.
1,435,675.
Patented Nov. 14, 1922.
5 SHEETS—SHEET 2.
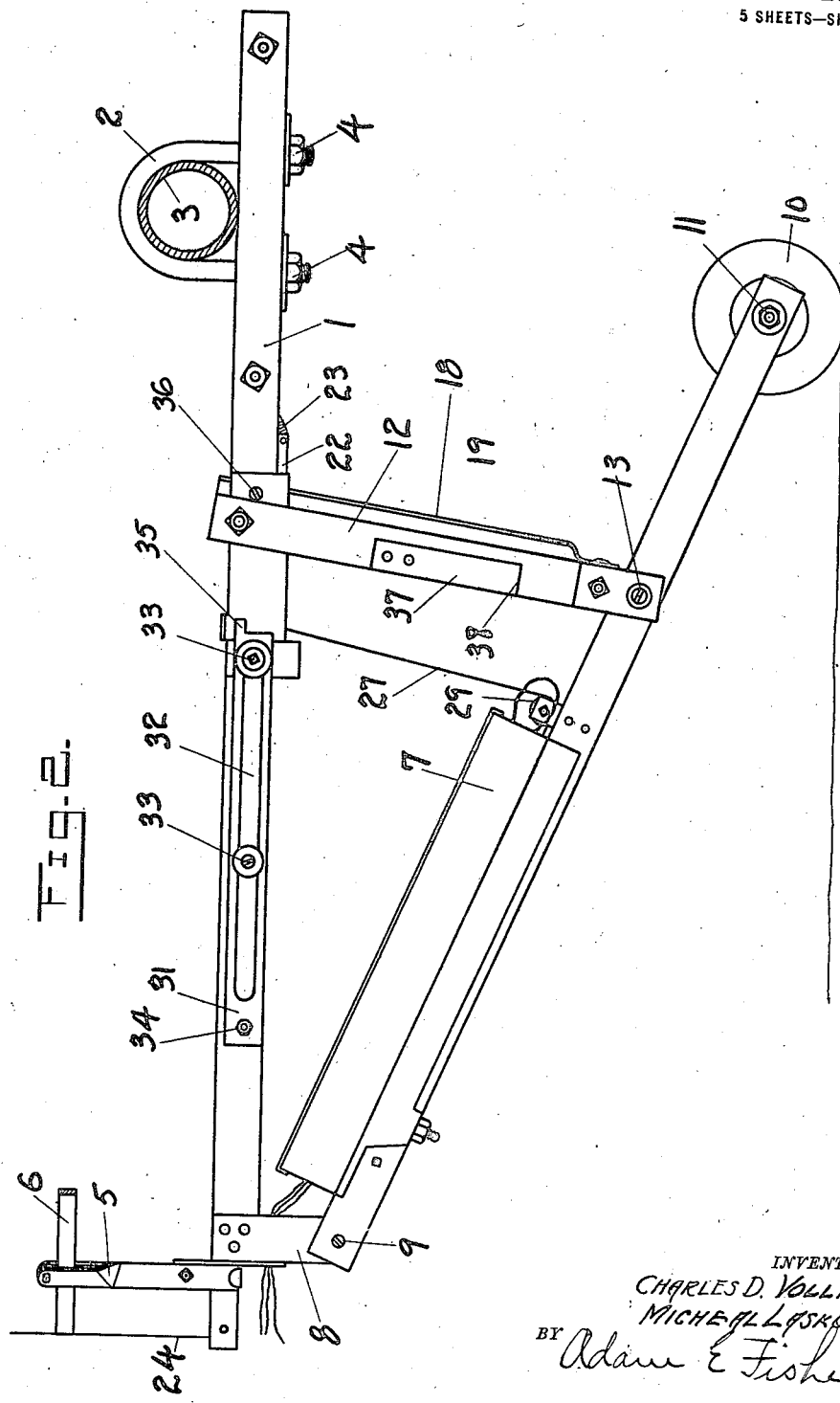
INVENTORS.
CHARLES D. VOLLMER.
MICHEAL LASKOWITZ.
BY Adam E Fisher
ATTORNEY.

C. D. VOLLMER AND M. LASKOWITZ.
AUTOMOBILE ALARM.
APPLICATION FILED JULY 23, 1919.

1,435,675.

Patented Nov. 14, 1922.
5 SHEETS—SHEET 3.

INVENTOR.
CHARLES D. VOLLMER.
MICHAEL LASKOWITZ
BY Adam E Fisher
ATTORNEY.

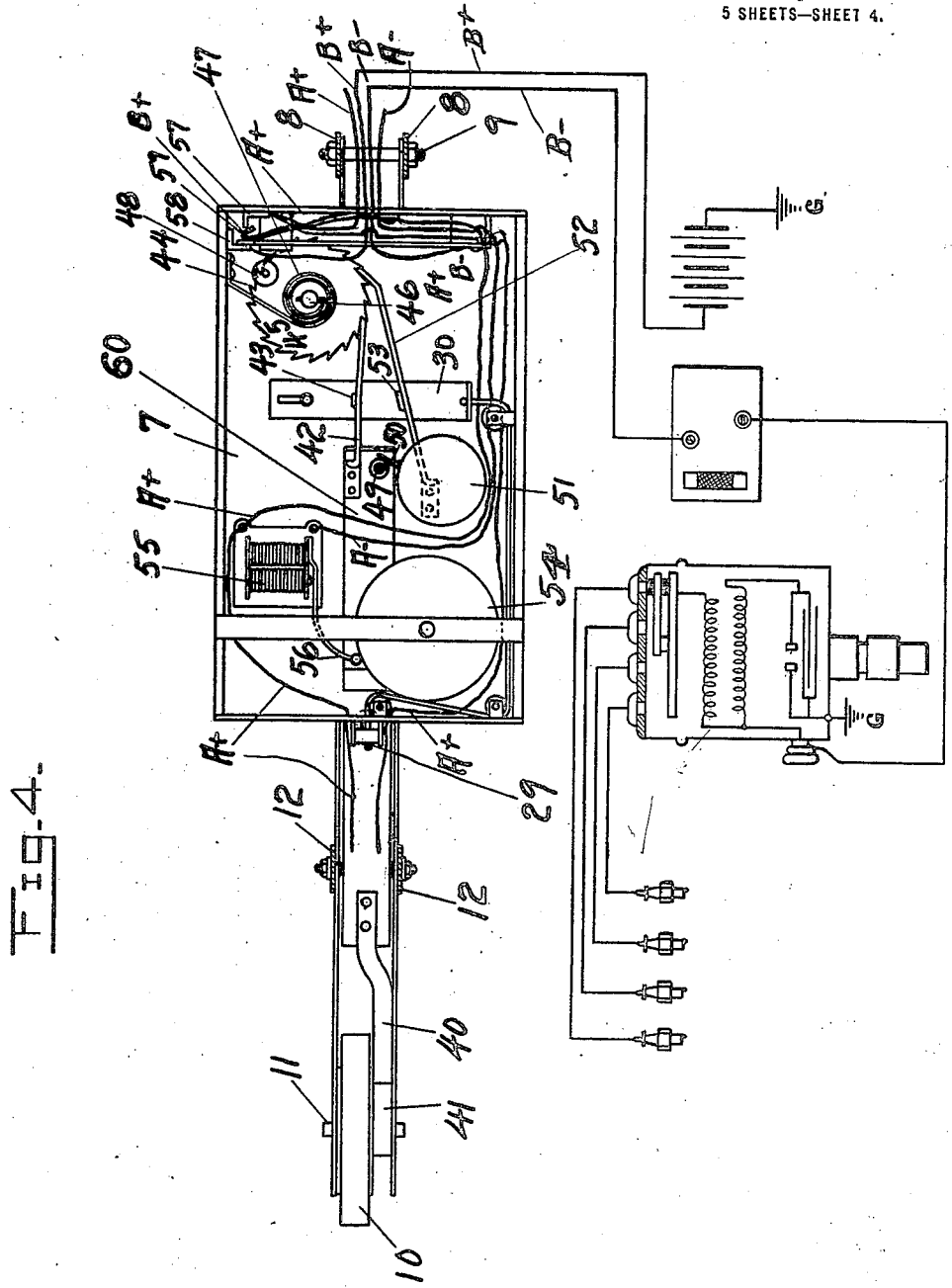

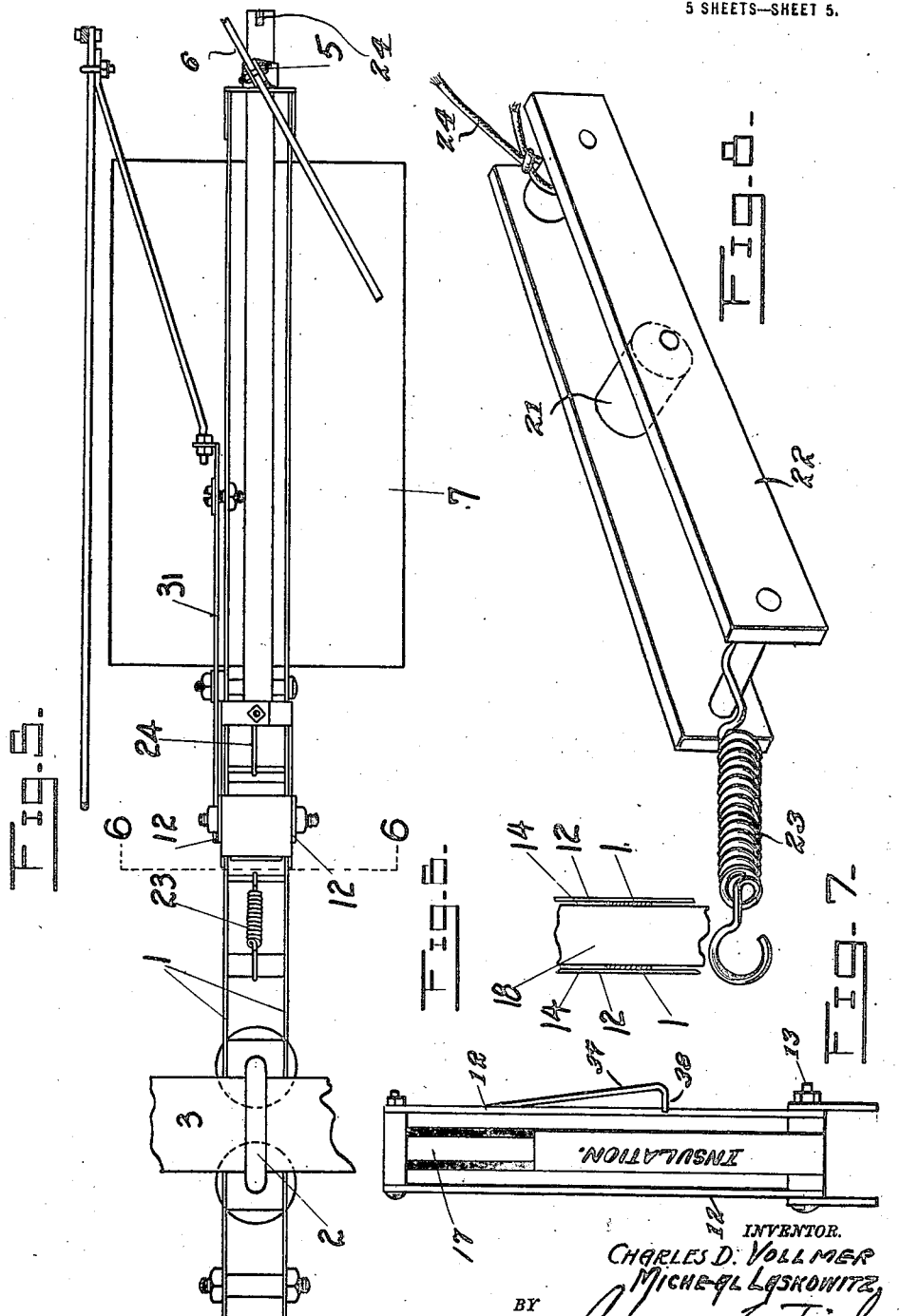

Patented Nov. 14, 1922.

1,435,675

UNITED STATES PATENT OFFICE.

CHARLES D. VOLLMER AND MICHAEL LASKOWITZ, OF ST. LOUIS, MISSOURI.

AUTOMOBILE ALARM.

Application filed July 23, 1919. Serial No. 312,876.

*To all whom it may concern:*

Be it known, that we, CHARLES D. VOLLMER and MICHAEL LASKOWITZ, citizens of the United States, residing in the city of St. Louis and State of Missouri, have invented new and useful Improvements in Automobile Alarms, of which the following is a specification, reference being had to the accompanying drawings.

The present invention is in the nature of an automatic alarm and safety device for automobiles.

The primary object of the invention is to provide a device of this nature which may be readily attached to any automobile and which will give both an alarm by bell when the machine is taken away by an unauthorized person and which will also automatically cut the electric current from the battery through the spark plugs so that the machine cannot be operated beyond a certain distance.

Another object is to provide a device of this nature whereby when an unauthorized person attempts to take the machine away a wheel element bearing upon and traversing the ground will automatically set in operation an alarm bell.

Another object is to provide means whereby when the emergency brake of an automobile is set and the machine is attempted to be driven away without releasing said brake, warning is given to the driver to that effect through the ringing of said bell.

Another object is to construct the device in as simple and practical a form as consistent with its effectiveness in operation and use.

In the drawings:

Figure 1 is a side elevation showing the device as mounted upon the chassis of an automobile and with the elements thereof in raised or inoperative position.

Figure 2 is a similar view showing the wheel element running upon the ground and thus in position for operating the alarm elements of the device.

Figure 3 is a longitudinal vertical section taken medially through the device.

Figure 4 is a plan view of the layout of the alarm elements of the device, including the mechanically operated bell, the electrically operated bell and the wiring system.

Figure 5 is a top plan view.

Figure 6 is a vertical sectional detail on the line 6—6 in Figure 5.

Fig. 7 is a detached view of the vertical bar connected to the pivoted bar; and

Fig. 8 is a detail perspective view of the sliding carriage.

Referring more particularly to the drawings, my invention consists of a main, horizontal, hollow support bar 1 which is clamped and secured to the chassis of the automobile by means of a strap 2 passed around the rear axle 3 and bolted in place by means of the nuts 4; while the front end of the bar 1 is secured forwardly to the chassis in any suitable manner, as by means of the clamp 5 engaging one of the stay-rods 6. The main bar 1 supports a casing 7, said casing being mounted upon a bar pivotally suspended from said main bar by means of a bracket 8 extended downwardly from said main bar and connected to said casing 7 through the pivot joint 9. This pivot joint 9 adapts the casing 7 to vertical motion but prevents the lateral motion of the bar carrying the casing. The rear end of the casing 7 is equipped with a wheel 10 which is journaled in the bar at 11 and which wheel is adapted to roll along the ground when the casing 7 is in depressed position, and thus operates the working elements of the device for the purpose of sounding the alarm as will be described. A bar 12 is pivotally attached to the frame 7 at the point 13 and extends upwardly and slidingly engages the main bar 1 through a vertical longitudinal slot 14 formed in said bar. The bar 12 likewise carries a covered transverse vertical slot 15, which opens forwardly at its upper end, the sides of said slot 15 carrying the electrical conductors 16 and 17 permanently mounted thereupon. A back guide strap 18 is permanently mounted along the back edge of the bar 12 and spaced therefrom so as to leave the intervening guide-way 19 which sets over the bolt 20, and thus the bolt 20 holds the bar 12 in approximately vertical position as the bar 12 moves up or down in the operation of the device. An insulated electrical contact roller 21 is mounted upon the sliding carriage 22, which sliding carriage is normally held in its rearmost position by means of the retractile spring 23 and when in its rearmost position, is adapted to pass between and connect the electrical conductors 16 and 17 as the brace 12 may be elevated, thus completing the circuit between said conductors. Said carriage 22 and electrical contact roller 21 may be drawn forward by the operation of pulling upon a cable 24 so that said electrical contact roller 21 will clear or pass forwardly of the front edge of the brace 12 as the latter may be elevated. The cable 24 passes interiorly through the main bar 1 and forwardly over a roller 25, thence up to a convenient point upon the dashboard of the machine within the reach of the operator. A retractile spring 26 normally holds this cable taut as to the end thereof disposed on the dashboard. A branch cable 27 extends over the roller 28 at the rear end of the main bar 1 and downwardly where it enters the casing 7 at the point 29. Within the casing it passes to one side thereof around a system of rollers as shown and the inner end is attached to the sliding bar 30. Thus, as the cable 24 is drawn upon by the hand of the operator the first effect is to pull forwardly the sliding carriage 22 so that the contact roller 21 will clear the front edge of the brace 12, then the branch cable 27 draws taut whereby the sliding bar 30 is pulled over to one side of the casing 7 for releasing the pawls from their ratchet wheel as will be described later on, and next the casing 7 is itself elevated against the underside of the main bar 1. However, the casing 7 will not be held in such elevated position until the emergency brake is released, thereby throwing backward the sliding lock bar 31. This sliding lock bar has a longitudinal slot 32 engaging the lugs 33 whereby it is normally held in sliding horizontal position. The forward end thereof pivotally engages the emergency brake bar by means of the bolt 34, while the rear end is formed with the latch 35, adapted to pass over the top of the stud 36 set in the side of the main bar 1. The bar 12 is provided with an outstanding plate 37 permanently mounted at one side thereof, and as the casing 7 is elevated and the emergency brake released, the lock bar 31 passes under the outstanding edge 38 of the plate 37 and over the top of the stud 36, thus holding the casing 7 in elevated position. As the emergency brake is set, however, upon stopping the machine the lock bar 31 is drawn forward, thus releasing the bar 12, and the casing 7 falls toward the ground, being carried along the ground by the wheel 10. The wheel 10 carries a rigidly mounted cam 39 upon one side thereof and a reciprocating bar 40 is connected with this cam by means of the ring 41 which encircles the cam 39, thus, as the wheel 10 rolls along the ground the bar 40 is given reciprocating motion. The forward end 60 of the bar 40 passes within the casing 7, and rigidly mounted at that end is a pawl 42 which passes over the sliding bar 30 to one side of the lug 43 and engages the ratchets 44 of the wheel 45. The wheel 45 is rigidly mounted upon the stub shaft 46 in one forward corner of the casing 7, the ends of said stub shaft being journaled in the casing. A flat coil spring 47, having one end permanently attached to the stub shaft 46 and the other end attached to the side of the casing, normally holds the wheel 45 in a certain set position. A roller 48 is mounted upon the upper side of the wheel 45 at the outer periphery thereof. A brake pawl 52 is mounted within the casing adjacent to pawl 42, passing to one side of the lug 53 and co-acting upon the ratchets of the wheel 45, together with the pawl 42, so as to lock said wheel against retrograde motion as the pawl 42 propels or moves the wheel around. The inner end 60 of the reciprocating bar 40 also carries a lug 49, adapted to impinge the trip 50, which mechanically operates the bell 51. It will be noted that both the pawl 42 and the brake pawl 52 may be moved out of engagement with the ratchets 44 by drawing the sliding bar 30 to one side, this being done by a pull upon the cable 24, as heretofore described, whereupon the wheel 45 would return to its normal position through the action of the spring 47. An electrically operated bell 54 is mounted adjacent to the bell 51, same being operated by means of the electromagnet 55 and the hammer 56. The electrical elements of the device comprise the electro magnet 55, as stated, and a wiring system consisting of lead and return wires A plus and A minus, extended from and back to a battery through the interior of the casing 7, and including a spark circuit B. The wires A plus are extended out backwardly through the casing 7, one each to the electrical conductors 16 and 17, respectively. This electrical system includes the insulated contact posts 57 and 58 and the insulated switch 59 with its free end adapted to swing between and alternately connect with said contact posts. The switch 59 is shifted between said contact post through the operation of the roller 48 as the wheel 45 revolves.

In operation the machine coming to a stand still, the emergency brake is set in usual form, and as the brake lever is pulled the lock bar 31 is drawn forwardly, releasing the casing 7 which falls downwardly, the wheel 10 then resting upon the ground. Should an unauthorized person then attempt to operate the car, as the wheel 10 moves along the ground, the reciprocating bar 40 and the lug 49 acting upon the trip 50 would operate to mechanically ring the bell 51; at the same time the pawl 42 would operate to rotate the wheel 45, and as the roller 48 travels around, it would operate to shift the switch 59 from the contact 58 to the contact 57. This would set up an electrical current through the wire A plus and through the electro magnet 55 and back through the wire A minus, thus electrically operating the bell 54. At the same time the current leading through the spark plug system through the wires B plus and B minus would be broken so that the car could not be further operated. Should the unauthorized person attempt to stop the mechanical ringing of the bell 51 by elevating the wheel 10 and the casing 7, the contact roller 21 being in its backmost position would pass between the conductors 16 and 17, thus connecting the current through the wires A plus and through the electro magnet 55, thereby again electrically ringing the bell 54. Should the operator himself attempt to proceed with his car without further drawing upon the cable 24 for the purpose of elevating the casing he would, of course, be notified by the mechanical ringing of the bell 51.

While I have herein described a certain specific method of constructing and assembling the elements of my invention, it is understood same may be varied in minor details, not departing from the spirit of my invention as defined in the appended claims.

What I claim to be new and patentable is:

1. In an automobile burglar alarm, a supporting bar attached to the chassis of an automobile, a bar pivoted at one end to the under side of said supporting bar, means for raising and lowering the free end of said pivoted bar and means for retaining the free end of said pivoted bar in raised position when the emergency brake of the automobile is released, a casing mounted upon said pivoted bar and containing an electric alarm instrument, an electric switch comprising a movable contact, and means for closing said switch comprising a ratchet wheel with a roller mounted on the side thereof for impinging on the movable contact and moving to the closed position when the ratchet wheel is rotated, a wheel mounted in the free end of said pivoted bar to roll along the ground when the bar is in lowered position, said wheel having a cam on one side thereof, a sliding bar mounted on said pivoted bar with one end projecting into the casing, means connecting said sliding bar to the cam for imparting reciprocating motion to the sliding bar when the wheel rolls along the ground, a pawl carried on the end of said sliding bar that projects into the casing for rotating said ratchet wheel when reciprocating motion is imparted to said sliding bar and a circuit connecting said alarm instrument to a source of energy through said switch.

2. In an automobile burglar alarm, a supporting bar attached to the chassis of an automobile, a bar pivoted at one end to the under side of said supporting bar, flexible means for raising and lowering the free end of said pivoted bar and means for retaining the free end of said pivoted bar in raised position when the emergency brake of the automobile is released, a casing mounted on said pivoted bar and containing an electric alarm instrument, an electric switch comprising a movable contact and means for closing said switch comprising a ratchet wheel with a roller mounted on the side thereof for impinging on the movable contact and moving to the closed position when the ratchet wheel is rotated, a wheel mounted in the free end of said pivoted bar to roll along the ground when the bar is in the lowered position, said wheel having a cam on one side thereof, a sliding bar mounted on said pivoted bar with one end projecting into the casing, means connecting said sliding bar to the cam for imparting motion to the sliding bar when the wheel rolls along the ground, a pawl carried on the end of said sliding bar that projects into the casing for rotating said ratchet wheel in one direction when reciprocating motion is imparted to said sliding bar, a circuit connecting said alarm instrument to a source of energy through said switch, a spring for moving said ratchet wheel in the opposite direction and means connected to said flexible means for moving said pawl out of engagement with the ratchet wheel.

3. In an automobile burglar alarm, a supporting bar attached to the chassis of an automobile, a bar pivoted at one end to the under side of said supporting bar, flexible means for raising and lowering the free end of said pivoted bar and means for retaining the free end of said pivoted bar in raised position when the emergency brake of the automobile is released, a casing mounted on said pivoted bar and containing an electric alarm instrument, an electric switch comprising a movable contact and means for closing said switch comprising a ratchet wheel with a roller mounted on the side thereof for impinging on the movable contact and moving to the closed positon when the ratchet wheel is rotated, a wheel mounted in the free end of said pivoted bar to roll along the ground when the bar is in the lowered position, said wheel having a cam on one side thereof, a sliding bar mounted on said pivoted bar with one end projecting into the casing, means connecting said sliding bar to the cam for imparting motion to the sliding bar when the wheel rolls along the ground, a pawl carried on the end of said sliding bar that projects into the casing for rotating said ratchet wheel in one direction when reciprocating motion is imparted to said sliding bar, a circuit connecting said alarm instrument to a source of energy through said switch, a spring for moving said ratchet wheel in the opposite direction, a locking pawl engaging said ratchet wheel and means connected to said flexible means for moving both of said pawls out of engagement with the ratchet wheel.

4. In an automobile burglar alarm, a supporting bar attached to the chassis of an automobile, a bar pivoted at one end to the under side of said supporting bar, flexible means for raising and lowering the free end of said pivoted bar and means for retaining the free end of said pivoted bar in raised position when the emergency brake of the automobile is released, a casing mounted on said pivoted bar and containing an electric alarm instrument, an electric switch comprising a movable contact and means for closing said switch comprising a ratchet wheel with a roller mounted on the side thereof for impinging on the movable contact and moving it to the closed position when the ratchet wheel is rotated, a wheel mounted in the free end of said pivoted bar to roll along the ground when the bar is in the lowered position, said wheel having a cam on one side thereof, a sliding bar mounted on said pivoted bar with one end projecting into the casing, means connecting said sliding bar to the cam for imparting motion to the sliding bar when the wheel rolls along the ground, a pawl carried on the end of said sliding bar that projects into the casing for rotating said ratchet wheel in one direction when reciprocating motion is imparted to said sliding bar, a circuit connecting said alarm instrument to a source of energy through said switch, a spring for moving said ratchet wheel in the opposite direction, a locking pawl engaging said ratchet wheel and a sliding bar within the casing connected to said flexible means and provided with lugs engaging said pawls for moving said pawls out of engagement with the ratchet wheel.

CHARLES D. VOLLMER.
MICHAEL LASKOWITZ.

Witnesses:
A. K. DOHLE,
A. M. DOWD.